(12) United States Patent
Renner et al.

(10) Patent No.: US 9,569,673 B2
(45) Date of Patent: Feb. 14, 2017

(54) METHOD AND DEVICE FOR DETECTING A POSITION OF A VEHICLE ON A LANE

(71) Applicant: Robert Bosch GmbH, Stuttgart (DE)

(72) Inventors: Christian Renner, Tuebingen (DE); Markus Hahn, Neu-Ulm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 158 days.

(21) Appl. No.: 14/425,100

(22) PCT Filed: Aug. 1, 2013

(86) PCT No.: PCT/EP2013/066188
§ 371 (c)(1),
(2) Date: Mar. 2, 2015

(87) PCT Pub. No.: WO2014/032904
PCT Pub. Date: Mar. 6, 2014

(65) Prior Publication Data
US 2015/0278610 A1 Oct. 1, 2015

(30) Foreign Application Priority Data
Aug. 29, 2012 (DE) ........................ 10 2012 215 322

(51) Int. Cl.
*B60Q 1/00* (2006.01)
*G06K 9/00* (2006.01)
(Continued)

(52) U.S. Cl.
CPC ....... *G06K 9/00791* (2013.01); *G06K 9/00798* (2013.01); *G06K 9/20* (2013.01);
(Continued)

(58) Field of Classification Search
CPC .. G06K 9/00791; G06K 9/00798; G06K 9/20; G06K 9/209; G06K 1/167; G06K 2009/2045
(Continued)

(56) References Cited

U.S. PATENT DOCUMENTS 6,819,779 B1 * 11/2004 Nichani ............. G06K 9/00798
382/104
7,876,926 B2 * 1/2011 Schwartz ........... G06K 9/00798
382/104
(Continued)

FOREIGN PATENT DOCUMENTS

DE   10 2006 021177    11/2007
EP       1 089 231      4/2001
(Continued)

*Primary Examiner* — Eric M Blount
(74) *Attorney, Agent, or Firm* — Norton Rose Fulbright US LLP

(57) ABSTRACT

A method for detecting a vehicle position on a lane, including: reading in a first image of a first camera, having a first optical axis and reading in at least a second image of at least a second camera having a second optical axis, the cameras being oriented so that the first and second optical axis intersect outside of the detection angle of the first and/or second camera, the first and the at least second image each enclosing a viewing angle deviating by an angle of 90 degrees maximum from the driving direction. Determining at least one interlinked image gradient for each of the first image and the at least second image. Assigning the at least one interlinked image gradient to a boundary object and assigning the at least one additional interlinked image gradient to a boundary object and/or to one additional boundary object, and ascertaining a relative position of the vehicle as to the boundary object and/or to the additional boundary object to detect the vehicle position.

10 Claims, 7 Drawing Sheets

(51) Int. Cl.
*G06K 9/20* (2006.01)
*G08G 1/16* (2006.01)

(52) U.S. Cl.
CPC .............. *G06K 9/209* (2013.01); *G08G 1/167* (2013.01); *G06K 2009/2045* (2013.01)

(58) Field of Classification Search
USPC ................................................. 340/435, 436
See application file for complete search history.

(56) References Cited

U.S. PATENT DOCUMENTS

2007/0091135 A1\* 4/2007 Hosaka ................ G06K 15/107
347/15
2011/0261168 A1\* 10/2011 Shima ........................ B60T 7/22
348/47

FOREIGN PATENT DOCUMENTS

| EP | 1 852 325 | 11/2007 |
| EP | 2 372 669 | 10/2011 |
| WO | 03/047900 | 6/2003 |

\* cited by examiner

METHOD AND DEVICE FOR DETECTING A POSITION OF A VEHICLE ON A LANE

FIELD OF THE INVENTION

The present invention relates to a method for detecting a position of a vehicle on a lane, to a corresponding device, a lane detection system and a corresponding computer program product.

BACKGROUND INFORMATION

Systems for detecting roadway markings (white/yellow) are nowadays based on mono or stereo cameras. The same applies to a steering assistance for the driver (lane keeping systems) based thereon. The vehicle is kept within the detected lane using a torque at the steering wheel. The series systems are characterized by high availability, but their availability may decrease in difficult situations such as backlighting, night, wetness, snow or also roadworks. The decrease in availability due to interference in the optical path and reflections on the road may also occur in stereo cameras, since there is a large, overlapping image section, and the effects occur in both camera images. One additional aspect lies in that a robust detection of the edge of the roadway is difficult to carry out when the lane is not bounded by markings but, for example, by a median strip or guard rails.

Previous systems may lead to a driver, who has become used to the system in "good situations," for example, on freeways in Germany, becoming uncertain in the case of decreased availability, in special situations or on poor roads, and trust in the system is thus lost and the acceptance is reduced. For prevailing systems it is presently a challenge to change from a well-marked road to a poorly marked country road.

There are inventions which use a front view camera and/or a rear view camera in a vehicle in order to enable a robust lane detection system even in backlighting situations.

Publication US 20070091135c A1 discusses, for example, an approach in which a lane keeping system is also possible based on a lane detection system. In a backlighting situation it may be problematic to keep the lane only based on the detection results from images of the rear view camera, since this requires an anticipation of the lane detection, which is not ensured by the front view camera in a backlighting situation, and which cannot be ensured by the rear view camera.

Patent document DE-102006021177 A1 discusses a system which uses radar sensors as well as side and rear view cameras in order to detect a lane change of preceding vehicles. No information is provided on lane detection.

SUMMARY OF THE INVENTION

Against this background, a method for detecting a position of a vehicle on a lane, furthermore a device which uses this method, as well as a corresponding computer program product according to the description herein are provided by the present invention. Advantageous embodiments are derived from the respective further description herein and the following description.

The present invention is based on the finding that the orientation of the optical axis of a camera may have a direct influence on many disturbance variables in an imaging method. Furthermore, the robustness of a system may be increased via redundancy and optical axes, which deviate from one another, of multiple optical detection systems. With the aid of intrinsic calibration and extrinsic calibration of the multiple camera systems, the images may be transformed into a common global coordinate system, making it possible to base further calculations on the image which is transformed into global coordinates.

The present invention provides a method for detecting a position of a vehicle on a lane, the method including the following:

reading in one first image of a first camera having a first optical axis and at least one second image of at least a second camera having a second optical axis, the first and second cameras being oriented in such a way that the first optical axis and the second optical axis intersect outside of the detection angle of the first camera and/or the second camera, and the first image and at least the second image each enclose a viewing angle, which deviates by an angle of 90 degrees maximum from the driving direction of the vehicle;

determining at least one interlinked image gradient in the first image and at least one additional interlinked image gradient in the at least second image;

assigning the at least one interlinked image gradient to a roadway boundary object and assigning the at least one additional interlinked image gradient to the roadway boundary object and/or to one additional roadway boundary object; and ascertaining a relative position of the vehicle to the roadway boundary object and/or to the additional roadway boundary object, in order to detect the position of the vehicle on the lane.

The vehicle may be a passenger vehicle, a commercial vehicle, or a motorcycle. The vehicle may be moved on a roadway having at least one lane. The lane may be available to a vehicle for driving in one direction. The lane may be marked by road markings, such as a roadway boundary and a lane boundary or a lane separator. Different lanes may also not be marked. A roadway boundary object may have a surface, color and/or structure which differs from that of the lane. A guide post and/or other devices of road equipment, for example, traffic signs or protective guide rails, may be a roadway boundary object. A position of the vehicle on a lane may denote a lateral distance of the vehicle from a lateral edge of a lane and/or an angle between the driving direction of the vehicle and the edge of the lane or roadway edge. At least two cameras may be situated in the vehicle. The cameras may each have one optical axis and one detection angle respectively. The optical axis may run through the center point of the recorded image. The optical axis of the first camera may be oriented within a tolerance range in the driving direction of the vehicle. An object detected by the first camera may be detected in the course over time by the at least second camera. A detection angle may be referred to as an angle of view and/or a horizontal angle of view.

A detection angle may be understood to be an angle between a viewing angle which characterizes the edge of an image and a viewing angle which characterizes the opposite edge of the image. A viewing angle may refer to a perspective with which an object is viewed or a direction which results from viewing the object. The viewing angle may refer to the optical axis and/or to the driving direction of the vehicle. An image gradient at an image point may represent the direction of the greatest intensity increase of the directly adjacent image points. An interlinked image gradient may be understood to mean a linking or combination of adjacent image gradients, the combined image gradients being able to have a corresponding direction and size of the image gradient within a tolerance range. An interlinked image gradient may also be referred to as a "string." An image point may here be referred to as a pixel. An adjacent image point may be understood to be an image point which is directly adjacent, i.e., two image points which touch one another, and/or the next and/or the image point after the next image point may also be referred to as adjacent image points. The arrangement of the cameras may be particularly advantageous so that in the case of an interference of the optical path due to an oncoming vehicle, only one camera is negatively influenced thereby.

The present invention has the advantage that by utilizing the images of the first and second cameras, which are oriented in different optical axes, the images may now be evaluated very well and robustly even in the case of an interference of the optical path (for example, due to blinding) of one camera. In this way, it may be ensured very easily that a position of the vehicle on a lane may be detected even in temporarily unfavorable situations when one camera is blinded in this unfavorable situation. In this situation, the images are not read in by a stereo camera, which is to detect and/or monitor what may be a large image section with both cameras, but the image is read in by a camera system, which is oriented in optical axes, which enables a robust processing of the read-in images in case of an interference of the optical path of one of the cameras.

It is also advantageous when, in one specific embodiment, the method includes a step of classifying the at least one interlinked image gradient and the at least one additional interlinked image gradient using image sections along the interlinked image gradients, and includes a step of selecting at least one classified interlinked image gradient, the classified interlinked image gradient representing the interlinked image gradient which is usable for a line trend estimate of the lane. The steps of classifying and selecting may take place after the step of assigning and prior to the step of ascertaining. A line trend estimate may create a boundary line for a lane. In the case of roadway boundary objects which are spaced apart from each other, a line trend estimate may create a course of the lane between two roadway boundary objects which are spaced apart from one another. Using a texture analysis or color classification, a much improved color classification in the images of the side view camera may be obtained than is possible in the related art, since more pixels or a larger image section may be used for a texture analysis and/or a color analysis due to the imaging characteristics.

Furthermore, in one specific embodiment, a quality value may respectively be assigned to the at least one interlinked image gradient and the at least one additional interlinked image gradient in the step of classifying, the quality value representing an accuracy and/or an expected variance of the at least one interlinked image gradient as the boundary of the lane. By assigning a quality value to an interlinked image gradient, a likelihood may be determined within the method for the position determination of the vehicle on the lane. This allows for a further increase in robustness of the method.

A quality value, or an expanded feature for an interlinked image gradient, enables a much improved classification of the lines as well as a time-robust tracing or tracking of the interlinked image gradients, which leads to the possibility of using spatiotemporal features for line trend estimation, which renders the algorithm more robust, more accurate and highly available. The spatiotemporally interlinked image gradients including associated features enable a complete roadway course estimate, since the features which have already been "seen" using the front view camera and assigned and tracked may also be found and analyzed in the images of the side view camera.

Furthermore, the image and the at least second image may also be calibrated intrinsically and/or extrinsically in the step of reading in. With intrinsic and/or extrinsic calibration, any arbitrary image point of the first image and/or of the second image may be unambiguously assigned to a position with respect to the vehicle. Such a calibration may be understood to mean, for example, a transformation of the image coordinates into a real coordinate system, for example with respect to a fixed point at the vehicle. In another specific embodiment of the present invention, the first image and the at least second image may include an overlapping subarea in the step of reading in. In an overlapping subarea, an object may be detected by the first camera as well as by the second camera. An overlapping subarea of the first image and the second image may facilitate an extrinsic calibration and/or an assignment of interlinked image gradients to roadway boundary objects. When an interlinked image gradient is shown in the overlapping subarea, an assignment in the first and in the second image may be more easily carried out. An overlapping subarea of the first image and the second image may in particular be present when the first optical axis of the first camera and the second optical axis of the second camera have an angle of less than 90 degrees. In one specific embodiment, one of the cameras may be oriented as a front view camera.

According to one additional specific embodiment of the present invention, at least one additional image of at least a third camera may be read in the step of reading in, the third optical axis of the at least third camera differing from the first optical axis of the first camera and from the second optical axis of the at least second camera. The third optical axis of the third camera may intersect the first optical axis and/or the second optical axis outside of the detection angle of the first camera and/or the second camera. The other image may enclose a viewing angle which deviates by an angle of 90 degrees maximum from the driving direction of the vehicle. In other words, the additional image has at least image sections which are oriented in the normal driving direction. The additional image may include a subarea which overlaps with a subarea of the first image and/or a subarea of the second image. The first camera may be a front view camera. The second camera and/or the third camera may be a side view camera(s), the optical axis of the second camera having an angle to the driving direction of the vehicle which may correspond to the negative angle of the optical axis of the third camera to the driving direction of the vehicle.

In another specific embodiment of the present invention, the method may include a step of creating a line trend model as the boundary of the lane using the roadway boundary object and/or the additional roadway boundary object, the line trend model describing the course of the lane and/or a future course of the lane. Such a specific embodiment of the present invention offers the advantage of continued use of the roadway boundary objects which were already ascertained, in order to enable a lane guidance in a driver assistance system. This offers the advantage that already ascertained and thus available objects may be used for another functionality.

Moreover, the present invention provides a device which is configured to carry out or implement the steps of the method according to the present invention in appropriate units. Also as a result of this embodiment variant of the present invention in the form of a device, the underlying object of the present invention may be achieved quickly and efficiently.

In the present case, a device may be understood to mean an electrical device which processes sensor signals and outputs control and/or data signals as a function thereof. The device may include an interface which may be configured as hardware and/or software. In a hardware configuration, the interfaces may, for example, be part of a so-called system ASIC, which includes various functions of the device. However, it is also possible that the interfaces are dedicated integrated circuits or are made, at least in part, of discrete components. In a software configuration, the interfaces may be software modules, which, for example, are present on a microcontroller together with other software modules.

Also advantageous is a computer program product having program code which may be stored on a machine-readable carrier such as a semiconductor memory, a hard disk, or an optical memory, and is used for carrying out the method according to one of the above-described specific embodiments when the program is executed on a computer or a device.

The present invention provides a lane detection system for detecting a position of a vehicle on a lane, the lane detection system including the following features:
  one first camera having a first optical axis;
  at least one second camera having a second optical axis, the first optical axis and the second optical axis intersecting outside of the detection angle of the first camera and/or the second camera, and the first camera and the at least second camera being configured to respectively enclose a viewing angle which deviates by an angle of 90 degrees maximum from the driving direction of the vehicle; and
  a device which includes units which are configured to carry out the steps of one variant of the aforementioned method in order to detect the position of a vehicle on the lane.

According to one aspect of the present invention, a very robust and highly available lane detection system may be provided, which is suitable as a supplier of input variables of a lane keeping system. One large advantage of the present invention lies in carrying out the arrangement of the cameras with, for example, one front view camera and one, in particular two, cameras installed on the side. Due to the arrangement of the side view camera it is also possible to, based on these alone, estimate an anticipatory lane boundary model of the vehicle. A lane detection algorithm is characterized, for example, by carrying out a complete estimate of the lane boundary model in the two, in particular three, camera images, and thus being able to detect the lane boundaries from different perspectives. Problems which would arise due to an interference of the optical path, opacity or reflections in the images of one of the cameras are thus avoided and a lane keeping function may thus still be enabled.

Due to the camera arrangement including one or multiple cameras oriented toward the side, a better color classification of lane markings or the edge of greenery is also enabled, since the side view cameras may be oriented orthogonally to the boundary almost to the greatest possible extent within a tolerance range, and are thus able to show them on many more pixels than the front view camera. Snow situations may also be detected very well. Whirled up snow or rain is also hardly able to cause any problems for the lane detection system due to the complete estimate. The detection or classification of raised objects, for example, guard rails, may be possible very well with the orthogonal arrangement of the cameras, since comparatively few perspective imaging effects occur.

The present invention is elucidated in greater detail below on the basis of the attached drawings as an example.

DETAILED DESCRIPTION

Figure 1:
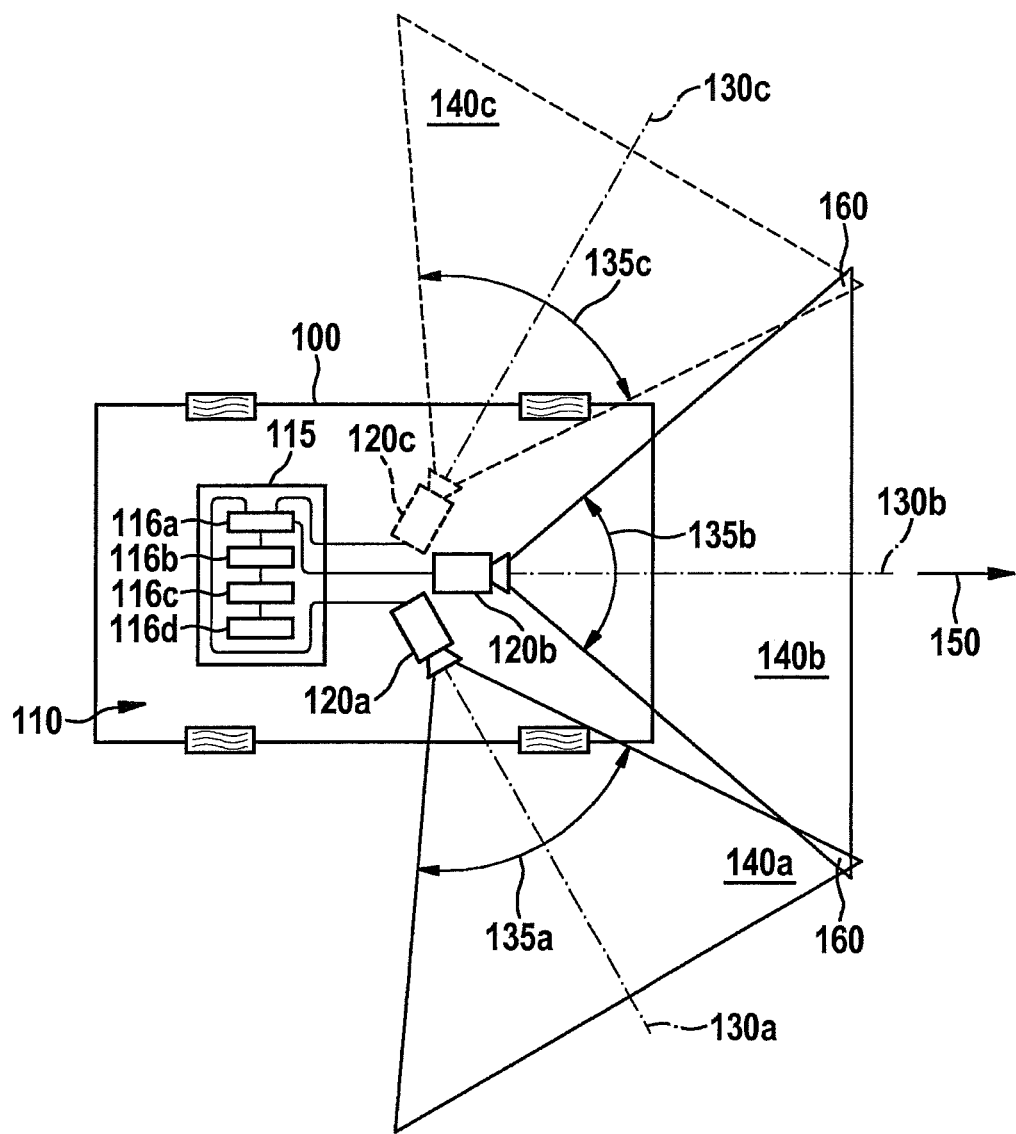
FIG. 1 shows a schematic representation of a vehicle having a lane detection system for detecting a position of the vehicle on a lane according to one exemplary embodiment of the present invention.

In the following description of exemplary embodiments of the present invention the same or similar reference numerals are used for similar elements in the different figures, a repeated description of those elements being omitted.

The following exemplary embodiments according to the present invention show a highly available lane detection system and a lane keeping system based on front view and side view camera systems.

In the approach presented here, a lane detection system is presented, which estimates a lane boundary model from the three images of the camera systems used. The exemplary embodiment of the algorithm presented here is characterized in that it is highly available due to the arrangement of the cameras and the complete estimate of the lane boundary model in the three camera images, and that it enables a lane keeping function even in situations such as backlighting, bad weather, poor roads, rainbands, roadworks, grass edges, snow, etc.

FIG. 1 shows a schematic representation of a vehicle having a lane detection system for detecting a position of a vehicle on a lane according to one exemplary embodiment of the present invention. A vehicle 100 has a lane detection system 110 including a device 115, the device including units in order to carry out a method for detecting a position of a vehicle on a lane. Device 115 has an interface 116a for reading in images of at least two cameras. Furthermore, device 115 includes a unit 116b for determining at least one interlinked image gradient per read-in image, a unit for associating 116c the at least one interlinked image gradient to a roadway boundary object per read-in image, as well as a unit for ascertaining 116d a relative position of the vehicle to the roadway boundary object in order to detect the position of the vehicle on the lane. Furthermore, lane detection system 110 includes a first camera 120a and a second camera 120b which are connected to interface 116a for reading in images of device 115. The exemplary embodiment shown in FIG. 1 includes a third camera 120c. First camera 120a has a first optical axis 130a. First camera 120a detects a first image using a detection angle 135a, a detection area 140a being detected. Second camera 120b has a second optical axis 130b. Second camera 120b detects a second image using a detection angle 135b, a detection area 140b being detected. Third camera 120c has a third optical axis 170. Third camera 120c detects a third image using a detection angle 135*c*, a detection area 140*c* being detected. Vehicle 100 is moving in driving direction 150. First camera 120*a* and second camera 120*b* have an overlapping image section 160. Second camera 120*b* and third camera 120*c* have an overlapping image section 160. Optical axis 130*b* of second camera 120*b* is essentially oriented in parallel to driving direction 150 in the exemplary embodiment shown in FIG. 1, meaning that second optical axis 130*b* of second camera 120*b* is situated in parallel to driving direction 150 within a tolerance range. First camera 120*a* and third camera 120*c* are situated as side view cameras, first camera 120*a* being directed in a viewing direction which is essentially to the right of driving direction 150, and third camera 120*c* is directed in a viewing direction which is essentially to the left of driving direction 150. The angle of the first optical axis to the driving direction is 60 degrees within a tolerance range. The angle between the second optical axis and the third optical axis is 60 degrees within a tolerance range.

Due to the at least two, in particular three, video cameras situated on the vehicle, a highly available lane detection algorithm may be implemented as described above, and thus the function of the lane keeping may be implemented in many more situations than in the related art.

In additional exemplary embodiments, which are not shown, no camera is situated as a front view camera and/or the angle between the optical axes varies between 5 degrees and 120 degrees.

Figure 2:
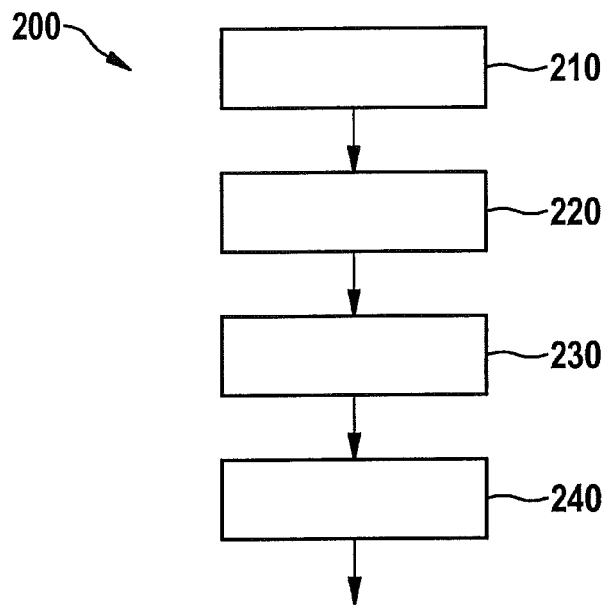
FIG. 2 shows a flow chart of a method for detecting a position of a vehicle on a lane according to one exemplary embodiment of the present invention.

FIG. 2 shows a flow chart of a method for detecting a position of a vehicle on a lane according to one exemplary embodiment of the present invention. Method 200 includes a step of reading in 210, a step of determining 220, a step of assigning 230, as well as a step of ascertaining 240. Method 200 may be carried out in one exemplary embodiment in device 115 shown in FIG. 1. For this reason, the reference numerals of FIG. 1 are used in order to make the correlations more clear.

In the step of reading in 210, one first image of a first camera having a first optical axis and at least one second image of at least one second camera having a second optical axis are read in, the first and second cameras being oriented in such a way that the first optical axis and the second optical axis intersect outside of the detection angle of the first camera and/or the second camera, and the first image and the at least second image each enclosing a viewing angle which deviates by an angle of 90 degrees maximum from the driving direction of the vehicle. In step of determining 220, at least one interlinked image gradient in the first image and at least one additional interlinked image gradient in the at least second image are determined. In step of assigning 230, the at least one interlinked image gradient is assigned to a roadway boundary object, and the at least one additional interlinked image gradient is linked to the roadway boundary object and/or to one additional roadway boundary object. In step of ascertaining 240, the relative position of the vehicle to the roadway boundary object and/or the other roadway boundary object is ascertained, in order to detect the position of the vehicle on the lane.

By using at least two, in particular three, calibrated cameras, a complete estimate of the roadway boundary model is carried out. One exemplary embodiment of the present invention may, besides the described method steps 210, 220, 230, 240, also be described with the steps preprocessing, calculation of expanded features, feature selection and transformation, line trend estimate, and line selection.

Method 200 is based on interlinked image gradient features (so-called strings) which are calculated in all of at least two, in particular three, camera images. Interlinked image gradients are interlinked gradients having a similar gradient orientation and gradient strength in the local proximity of individual gradients, which means that, along a longer interlinked image gradient, gradient strength and gradient orientation may change, at times significantly. In the local surroundings of all "good" interlinked image gradients, expanded features are calculated from the images of the cameras. These expanded features serve for the classification of lines and are calculated in the local surroundings of an interlinked image gradient. Examples of expanded features may be texture analyses, color saturation analyses or optical flow on the left and on the right next to the string.

From the interlinked image gradients of the images of the camera, those need to be chosen which describe the roadway boundary. When the cameras are calibrated, the classification required for the line trend estimate or spatiotemporal feature may be transformed into the global coordinate system. A dynamic online calibration and a surface area estimate are also useful for the transformation of pixel coordinates into global coordinates. The interlinked image gradients of the front view camera are particularly suited for detecting the lane boundary course with higher anticipation. The interlinked image gradients from the two side view cameras are very well suited for a color classification of the gradient progression and are very important, among other things, for high availability and accuracy, since the lane boundary is displayed on many more pixels than in the image of the front view camera. Furthermore, raised objects, for example, guard rails, may be classified much better due to optical flow in the images of the side view cameras, than using the image of one single front view camera.

The selection of the "good" interlinked image gradients with their associated quality values regarding the line trend estimate begins with the interlinked image gradients from the images of the side view camera or side view cameras. All "good" interlinked image gradients are chosen and transformed into the global coordinate system. The global coordinate system establishes the connection between the cameras with each other and also allows, besides the spatiotemporal features, a complete estimate of the lane boundary model, for example using splines or a clothoid. Based on the interlinked image gradients of the side view camera(s), the interlinked image gradients, which describe the lane boundary, are searched for in the image of the front view camera. Furthermore, a search for additional interlinked image gradients, which might describe the future roadway course, is carried out.

An estimation of line trend models, for example, clothoids or splines, based on the spatiotemporal strings with their quality values or expanded features selected and transformed into the global coordinate system is carried out. The tracked lines which were identified as lane boundary are selected. The line selection is much better than before due to the quality values at the interlinked image gradients and the tracking of the interlinked image gradients, since false positive line selections may largely be avoided due to the expanded features from images of the side view camera or the side view cameras. For example, the edges of wet patches, which, today, still pose problems, are unambiguously identifiable using side view cameras. Interferences of the optical path (for example, blinding) are much less of a problem for the novel algorithm and the camera arrangement, since much more information than before is available due to the three camera images and the spatiotemporally tracked interlinked image gradients. Furthermore, it is only possible for one camera to be completely blinded at any one time.

Figure 3:
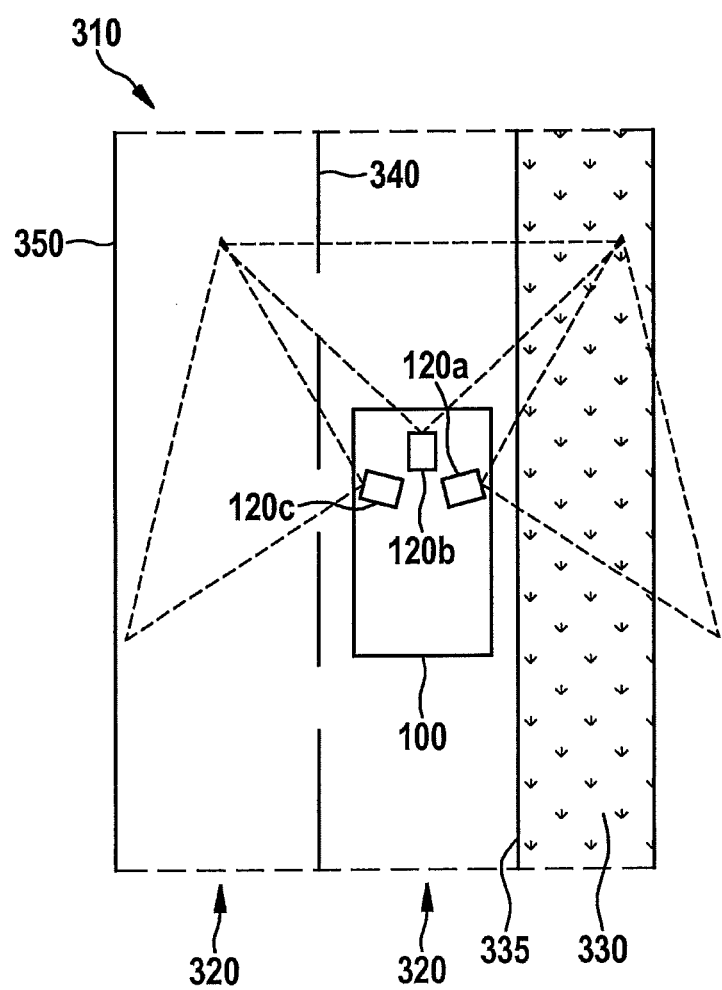
FIG. 3 shows a schematic illustration of a vehicle having a lane detection system on a lane according to one exemplary embodiment of the present invention.

FIG. 3 shows a schematic illustration of a vehicle having a lane detection system on a lane according to one exemplary embodiment of the present invention. Roadway 310 has two lanes 320. Roadway 310 is bounded by a median strip 330, which has a grass edge 335 along roadway 310. Grass edge 335 represents the boundary between roadway 310 and median strip 330. Roadway 310 furthermore includes roadway markings. A lane separator 340 is situated in the middle of roadway 310 as a longitudinal marking, which visually divides two lanes 320 with a broken line on roadway 310. On the side of roadway 310 which is opposite grass edge 335, roadway 310 includes a roadway boundary 350. Roadway boundary 350 is also referred to as border line 350. On lane 320 which is on the side of the grass edge, a vehicle 100, which has three cameras 120a, 120b, 120c, is situated similarly to FIG. 1, second camera 120b being arranged as a front view camera, first camera 120a being arranged as a side view camera to the right of the driving direction, and third camera 120c being arranged as a side view camera to the left of the driving direction of the vehicle. The detection area of first camera 120a and third camera 120c respectively includes at least one viewing angle which is directed at least partly to the front, as well as one viewing angle which is directed partly to the rear with respect to the driving direction of the vehicle. The detection area of first camera 120a and the detection area of second camera 120b have an overlapping subarea 160. The detection area of second camera 120b and the detection area of third camera 120c have an overlapping subarea 160.

The example of grass edges on country roads shows that the camera arrangement and the provided algorithm are advantageous. If one single front view camera 120a is used, the estimate and detection of the line trend of grass edge 335 is not always simple, since the transition from road 310 to grass edge 335 is difficult to detect, most notably in the area of color classification. If one uses a method according to the present invention it is much easier, since grass edges 335 are detected accurately and classified by side view cameras 120a, 120c, and then also on the basis of present previous information, that these may be grass edges, an estimate of grass edge 335 is made possible very well in front view camera 120b.

Cameras 120a, 120b, 120c are, as shown in FIG. 3, situated in such a way that there is a very small overlap area 160 between front view camera 120b and side view cameras 120a, 120c.

In side view cameras 120a, 120c, wide-angle lenses are advantageous in one exemplary embodiment. For front view camera 120b, a camera having a standard focal length is provided in the exemplary embodiment shown in FIG. 3.

Cameras 120a, 120b, 120c are intrinsically and extrinsically calibrated. A global coordinate system having the middle-rear axle as the center is used as a base coordinate system. Due to the extrinsic calibration, the reference to the global coordinate system is established for each camera 120a, 120b, 120c.

In the subsequent FIGS. 4 through 7, the method described in FIG. 2 for detecting a position of a vehicle on a lane according to one exemplary embodiment of the present invention is explained in greater detail on the basis of the schematic representation shown in FIG. 3 of a vehicle 100 having a lane detection system on a lane according to one exemplary embodiment of the present invention.

Figure 4:
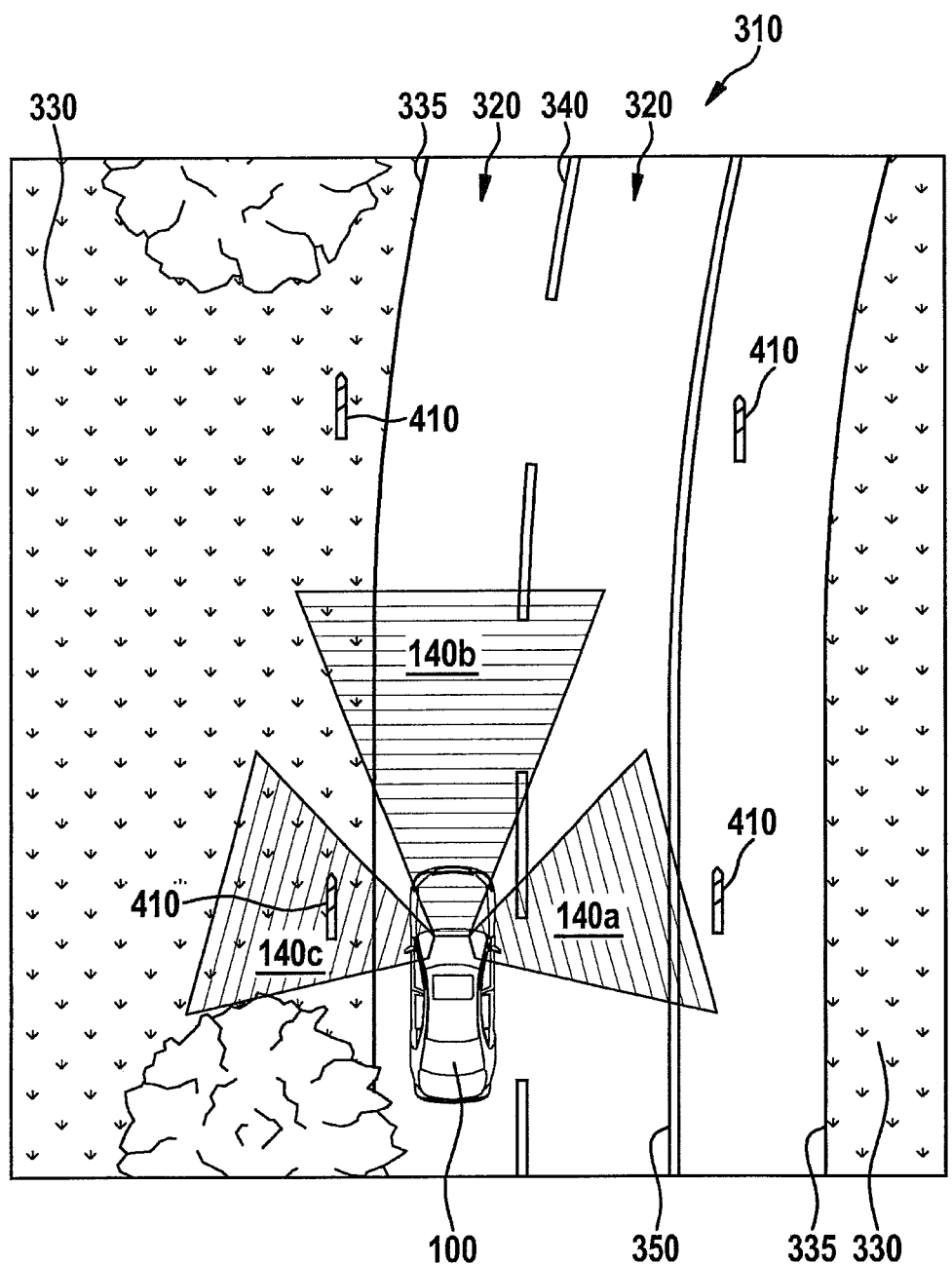
FIGS. 4, 5, 6, 7, and 8 show further schematic representations of the schematic representation shown in FIG. 3 of a vehicle having a lane detection system according to one exemplary embodiment of the present invention.

FIG. 4 shows, from a bird's eye view, a schematic representation of a vehicle having a lane detection system according to one exemplary embodiment of the present invention. Vehicle 100 includes one front view camera, one side view camera pointing to the right of the driving direction, and one side view camera pointing to the left of the driving direction. The side view camera looking to the right of the driving direction has a detection area 140a. The front view camera looking ahead in the driving direction has a detection area 140b. The side view camera looking to the left of the driving direction has a detection area 140c.

A roadway 310 is bounded on two sides opposite one another by a grass edge 335. Adjacent to grass edge 335 is a median strip 330. Roadway 310 has road markings. One road marking is configured as a lane separator 340, while one other road marking is configured as a roadway boundary 350. Two lanes 320 are configured on roadway 310, one lane 320 being bounded by grass edge 335 and lane separator 340 and other lane 320 being bounded by lane separator 340 and roadway boundary 350. Vehicle 100 is located on lane 320, which is bounded by grass edge 335 and lane separator 340. Roadways (lanes) 320 are also bounded by guide posts 410. One guide post 410 may also be referred to as a guide picket. Lane separator 340, roadway boundary 350, one guide post 410 and/or one grass edge 335 may together be referred to as roadway boundary objects.

Figure 5:
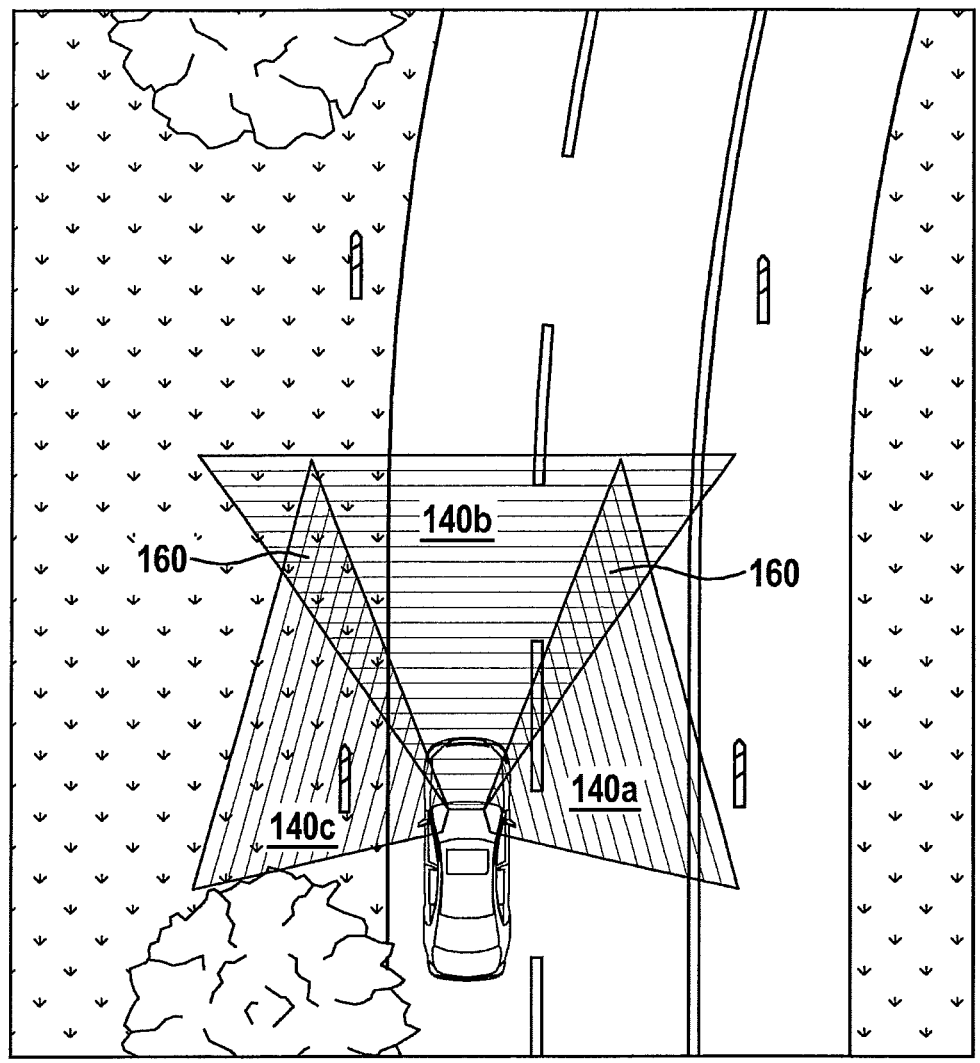

FIG. 5 shows, from a bird's eye view, a schematic representation of a vehicle having a lane detection system according to one exemplary embodiment of the present invention. The diagram corresponds to the diagram already shown in FIG. 4. The overlapping subareas of detection areas 140a, 140b, 140c are highlighted. The vehicle includes a front view camera and side view cameras having slightly overlapping fields of vision 140a, 140b and 140c, these overlapping fields of vision being marked with reference numeral 160.

Figure 6:
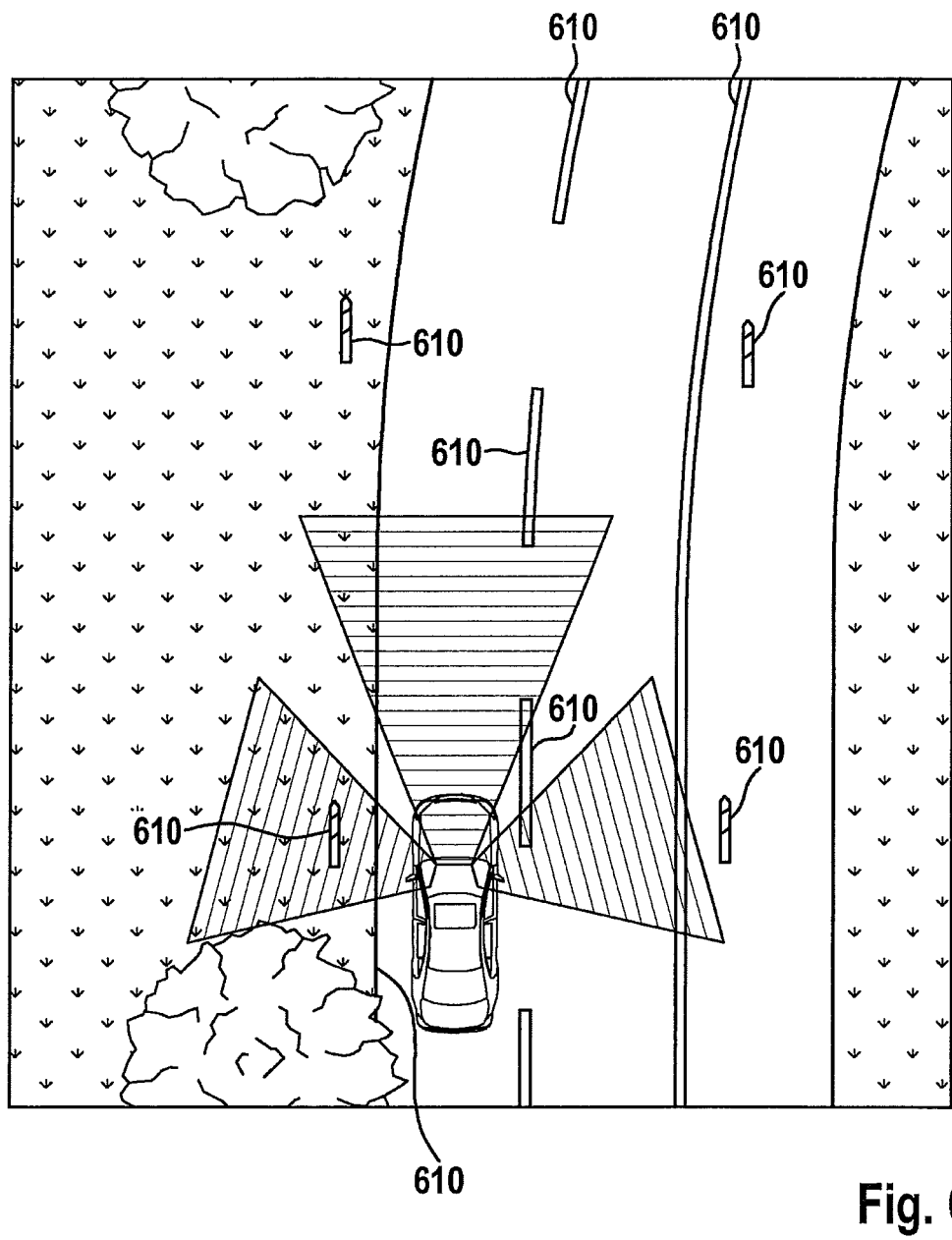

FIG. 6 shows, from a bird's eye view, a schematic representation of a vehicle having a lane detection system according to one exemplary embodiment of the present invention. The diagram corresponds to the diagram already shown in FIG. 4. The interlinked image gradients 610 determined in the step of determining of the method described in FIG. 2 for detecting a position of a vehicle on a lane, and which are assigned in the step of assigning the same method to individual roadway boundary objects, are highlighted. The interlinked image gradients 610 symbolize the roadway boundary objects described in FIG. 4 such as a lane separator, a roadway boundary, a guide post and/or a grass edge. In other exemplary embodiments not shown, further roadway boundary objects are detected with the aid of interlinked image gradients. The described method ascertains in the step of ascertaining the relative position of the vehicle in relation to the roadway boundary object.

Figure 7:
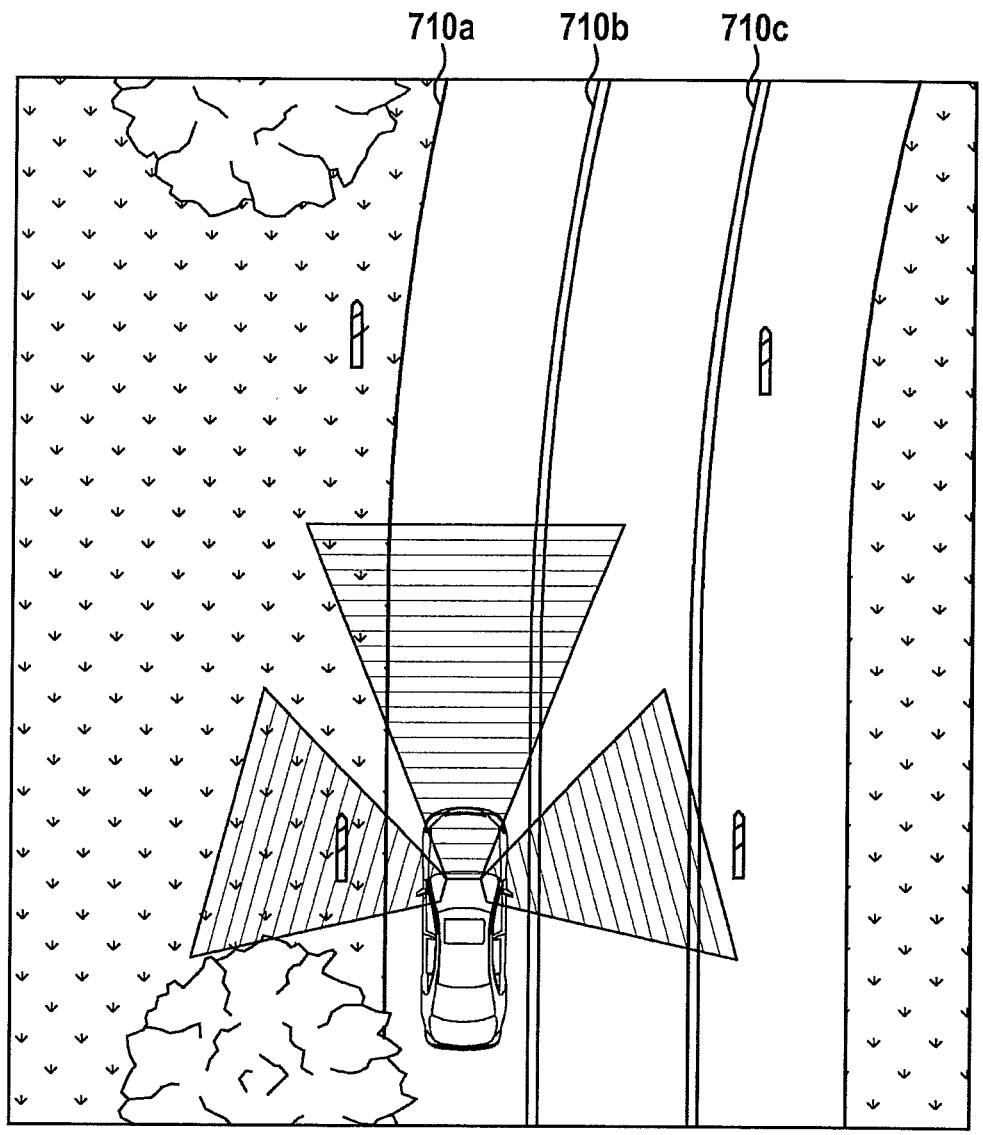

FIG. 7 shows, from a bird's eye view, a schematic representation of a vehicle having a lane detection system according to one exemplary embodiment of the present invention. In one particular exemplary embodiment according to the present invention, a line trend model is created in the step of creating, in which the interlinked image gradients shown in FIG. 6 are combined into a line trend model. Interlinked image gradients turn into lane boundary lines 710a, 710b, 710c. A line trend estimate is carried out on the basis of the selected interlinked image gradients or feature. In the present exemplary embodiment of FIG. 7, three lane boundary lines are estimated and tracked over time.

Figure 8:
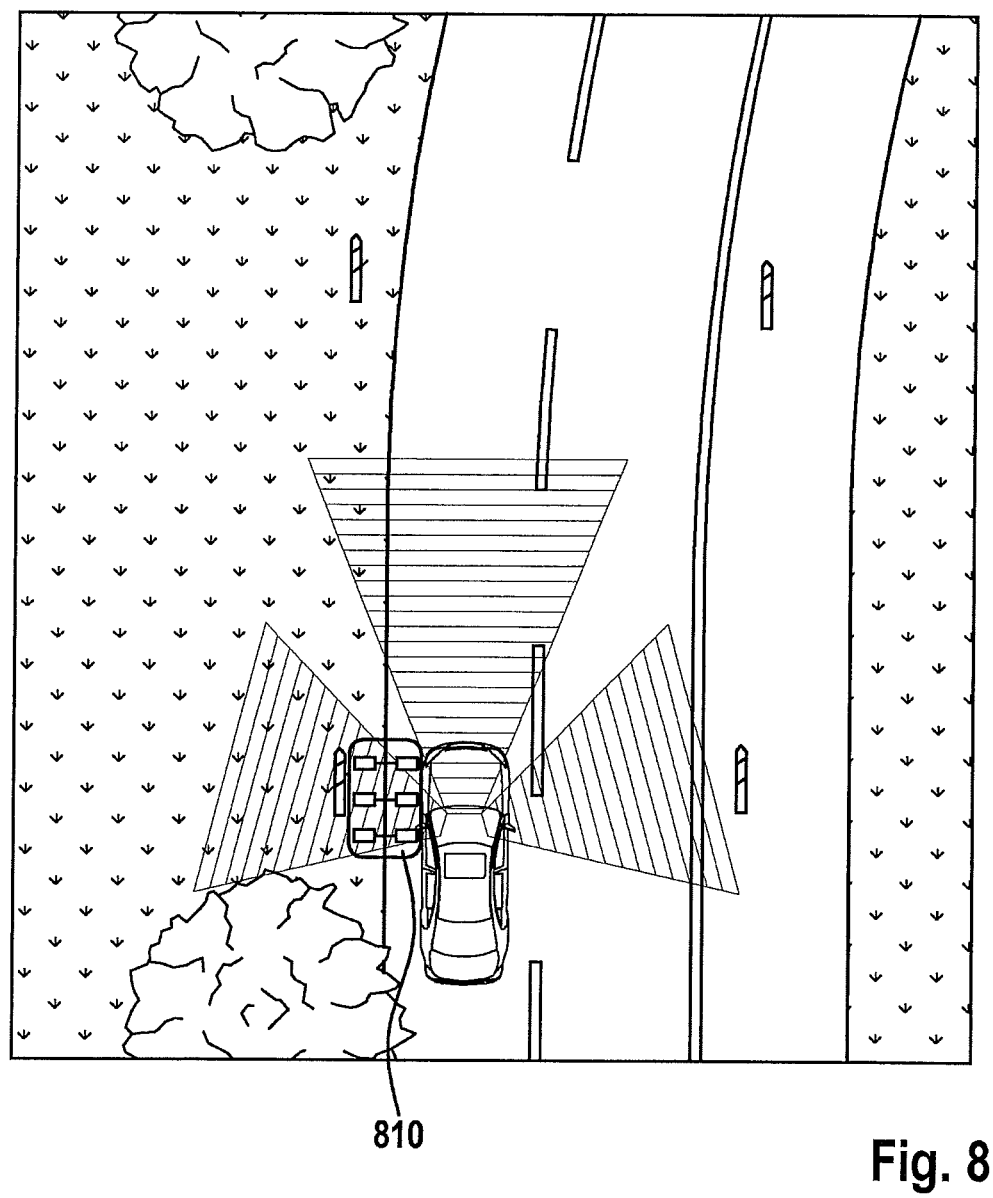

FIG. 8 shows, from a bird's eye view, a schematic representation of a vehicle having a lane detection system according to one exemplary embodiment of the present invention. The exemplary embodiment of the present invention illustrates a classification of the interlinked image gradients. In an optional step of the method according to one exemplary embodiment of the present invention, the interlinked image gradients and their surrounding boundary areas are classified. Analysis areas 810 for color classification are to the left and right along the principal extension direction of an interlinked image gradient, which means that they are to the right and left according to the orientation of the interlinked image gradients. A texture analysis or color classification is also conceivable as an expanded feature. Here, a much better color classification in the images of the side view cameras is possible and a better object flow in the side view cameras is implementable.

The exemplary embodiments described here and illustrated in the figures are selected only as examples. Different exemplary embodiments may be combined with each other completely or in regard to individual features. One exemplary embodiment may also be supplemented by features of another exemplary embodiment.

Furthermore, method steps according to the present invention may also be repeated or carried out in a sequence different from the sequence described.

If one exemplary embodiment includes an "and/or" link between a first feature and a second feature, this is to mean that the exemplary embodiment according to one specific embodiment includes both the first and the second feature, and according to another specific embodiment includes only the first feature or only the second feature.

What is claimed is:

1. A method for detecting a position of a vehicle on a lane, the method comprising:
   reading in one first image of a first camera having a first optical axis and of at least one second image of at least one second camera having a second optical axis, the first camera and the second camera being oriented so that the first optical axis and the second optical axis intersect outside of the detection angle of the first camera and/or the second camera, wherein the first image and at least the second image each enclose a viewing angle which deviates by an angle of 90 degrees maximum from a driving direction of the vehicle;
   determining at least one interlinked image gradient in the first image and at least one additional interlinked image gradient in the at least second image;
   assigning the at least one interlinked image gradient to a roadway boundary object and the at least one additional interlinked image gradient to the roadway boundary object and/or to an additional roadway boundary object; and
   ascertaining a relative position of the vehicle to the roadway boundary object and/or the additional roadway boundary object to detect the position of the vehicle on the lane.

2. The method of claim 1, further comprising:
   classifying the at least one interlinked image gradient and the at least one additional interlinked image gradient using image sections along the interlinked image gradients and selecting at least one classified interlinked image gradient, which represents the interlinked image gradient which is usable for a line trend estimate of the lane.

3. The method of claim 2, wherein in the classifying, one quality value is assigned to the at least one interlinked image gradient and the at least one additional interlinked image gradient each, the quality value representing an accuracy and/or an expected variance of the at least one interlinked image gradient as a boundary of the lane.

4. The method of claim 1, wherein in the reading in, the image and the at least second image are calibrated intrinsically and/or extrinsically.

5. The method of claim 1, wherein in the reading in, the first image and the at least second image have an overlapping subarea.

6. The method of claim 1, wherein in the reading in, at least one additional image of at least a third camera is read in, the optical axis of the at least third camera deviating from the optical axis of the first camera and from the optical axis of the at least second camera).

7. The method of claim 1, further comprising:
   creating a line trend model as a boundary of the lane using the roadway boundary object and/or the additional roadway boundary object, the line trend model describing the course of the lane and/or a future course of the lane.

8. A device for detecting a position of a vehicle on a lane, comprising:
   a reading arrangement to read in one first image of a first camera having a first optical axis and of at least one second image of at least one second camera having a second optical axis, the first camera and the second camera being oriented so that the first optical axis and the second optical axis intersect outside of the detection angle of the first camera and/or the second camera, wherein the first image and at least the second image each enclose a viewing angle which deviates by an angle of 90 degrees maximum from a driving direction of the vehicle;
   a determining arrangement to determine at least one interlinked image gradient in the first image and at least one additional interlinked image gradient in the at least second image;
   an assigning arrangement to assign the at least one interlinked image gradient to a roadway boundary object and the at least one additional interlinked image gradient to the roadway boundary object and/or to an additional roadway boundary object; and
   an ascertaining arrangement to ascertain a relative position of the vehicle to the roadway boundary object and/or the additional roadway boundary object to detect the position of the vehicle on the lane.

9. A computer readable medium having a computer program, which is executable by a processor, comprising:
   a program code arrangement having program code for detecting a position of a vehicle on a lane, by performing the following:
   reading in one first image of a first camera having a first optical axis and of at least one second image of at least one second camera having a second optical axis, the first camera and the second camera being oriented so that the first optical axis and the second optical axis intersect outside of the detection angle of the first camera and/or the second camera, wherein the first image and at least the second image each enclose a viewing angle which deviates by an angle of 90 degrees maximum from a driving direction of the vehicle;
   determining at least one interlinked image gradient in the first image and at least one additional interlinked image gradient in the at least second image;
   assigning the at least one interlinked image gradient to a roadway boundary object and the at least one additional interlinked image gradient to the roadway boundary object and/or to an additional roadway boundary object; and ascertaining a relative position of the vehicle to the roadway boundary object and/or the additional roadway boundary object to detect the position of the vehicle on the lane.

10. A lane detection system for detecting a position of a vehicle on a lane, comprising:

a first camera having a first optical axis;

at least one second camera having a second optical axis, the first camera and the second camera being oriented so that the first optical axis and the second optical axis intersect outside of the detection angle of the first camera and/or the second camera, and the first camera and the at least second camera being configured to each enclose a viewing angle which deviates by an angle of 90 degrees maximum from a driving direction of the vehicle; and a device for detecting a position of a vehicle on a lane, including:

a reading arrangement to read in the first image of the first camera having the first optical axis and of the at least one second image of the at least one second camera having the second optical axis;

a determining arrangement to determine at least one interlinked image gradient in the first image and at least one additional interlinked image gradient in the at least second image;

an assigning arrangement to assign the at least one interlinked image gradient to a roadway boundary object and the at least one additional interlinked image gradient to the roadway boundary object and/or to an additional roadway boundary object; and an ascertaining arrangement to ascertain a relative position of the vehicle to the roadway boundary object and/or the additional roadway boundary object to detect the position of the vehicle on the lane.

* * * * *